US012688242B1

(12) United States Patent
Horst et al.

(10) Patent No.:  US 12,688,242 B1
(45) Date of Patent:      Jul. 21, 2026

(54) ENHANCED ENTITY RECOGNITION SERVICES FOR CLASSIFYING USER INTENTS

(71) Applicant: Bold Limited, Hamilton (BM)

(72) Inventors: Martin Horst, Seattle, WA (US); Isabella Barbier, Sunnyvale, CA (US); Vaibhav Mahajan, Noida (IN); Vikrant Verma, Noida (IN); Yashik Vohra, Delhi (IN); Vishwajeet Samal, Noida (IN)

(73) Assignee: BOLD Limited, Hamilton (BM)

( * ) Notice: Subject to any disclaimer, the term of this patent is extended or adjusted under 35 U.S.C. 154(b) by 0 days.

(21) Appl. No.: 19/058,832

(22) Filed: Feb. 20, 2025

(51) Int. Cl.
    *G06F 16/906*        (2019.01)

(52) U.S. Cl.
    CPC ................................. *G06F 16/906* (2019.01)

(58) Field of Classification Search
    CPC ..................................................... G06F 16/906
    See application file for complete search history.

(56) References Cited

U.S. PATENT DOCUMENTS 9,519,706 B2 * 12/2016 Luke ...................... G06F 16/34
11,416,777 B2 * 8/2022 Singaraju .......... G06F 16/90332
11,625,450 B1 * 4/2023 Roman ................. H04L 67/535
                                                              707/721
12,315,052 B2 * 5/2025 Bera ..................... G06F 40/284
2015/0012912 A1 * 1/2015 Cheriton ............ G06F 9/45508
                                                              717/139
2016/0267064 A1 * 9/2016 Ran ........................ G06F 3/017
2017/0270195 A1 * 9/2017 Zhang ................ G06Q 30/0255
2020/0250679 A1 * 8/2020 Arora ....................... G07C 9/25
2024/0394169 A1 * 11/2024 Meurer .............. G06F 11/3476
2025/0094710 A1 * 3/2025 Wu ......................... G16H 20/10
2025/0111155 A1 * 4/2025 Niu ......................... G06F 40/30

* cited by examiner

*Primary Examiner* — Etienne P Leroux
(74) *Attorney, Agent, or Firm* — Dinsmore & Shohl LLP

(57)                ABSTRACT

Certain aspects of the disclosure provide a method performing entity recognition to classify user inputs for resolving user intent. In aspects, the method includes receiving user input comprising a text string associated, the user input associated with a web-based application; generating a transformed text string by applying a set of rule-based alterations to the user input; parsing the transformed text string to identify a set of tokens; identifying one or more prioritized tokens from the set of tokens; sequentially executing a set of ordered binary classification tests for each of the one or more prioritized tokens until a true indication associated with a sequential binary classification test of the set of ordered binary classification tests is received; and sending a classification for the user input to a domain service associated with a content service of the web-based application.

20 Claims, 6 Drawing Sheets

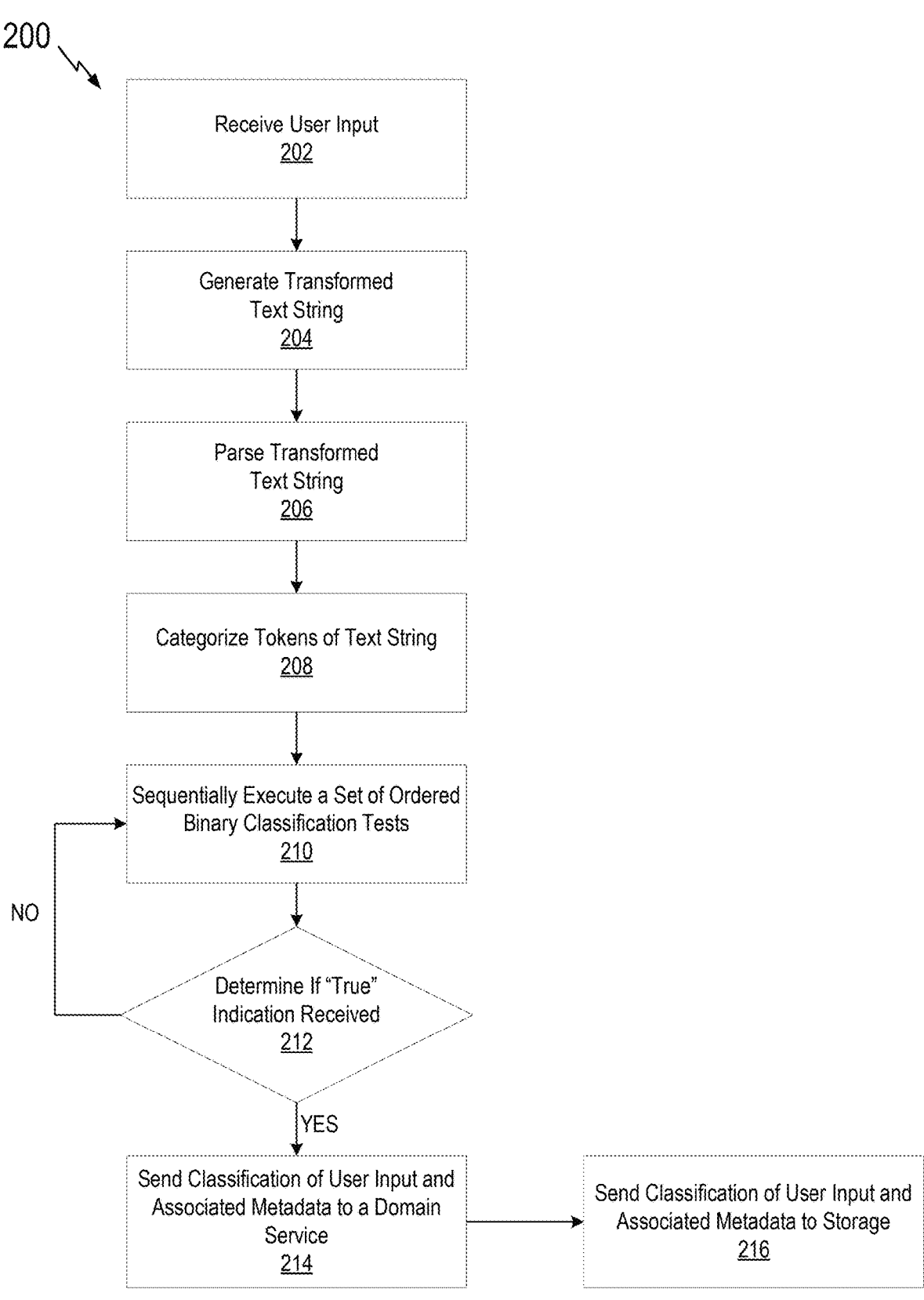

200

Receive User Input
202

Generate Transformed
Text String
204

Parse Transformed
Text String
206

Categorize Tokens of Text String
208

Sequentially Execute a Set of Ordered
Binary Classification Tests
210

NO

Determine If "True"
Indication Received
212

YES

Send Classification of User Input and
Associated Metadata to a Domain
Service
214

Send Classification of User Input and
Associated Metadata to Storage
216

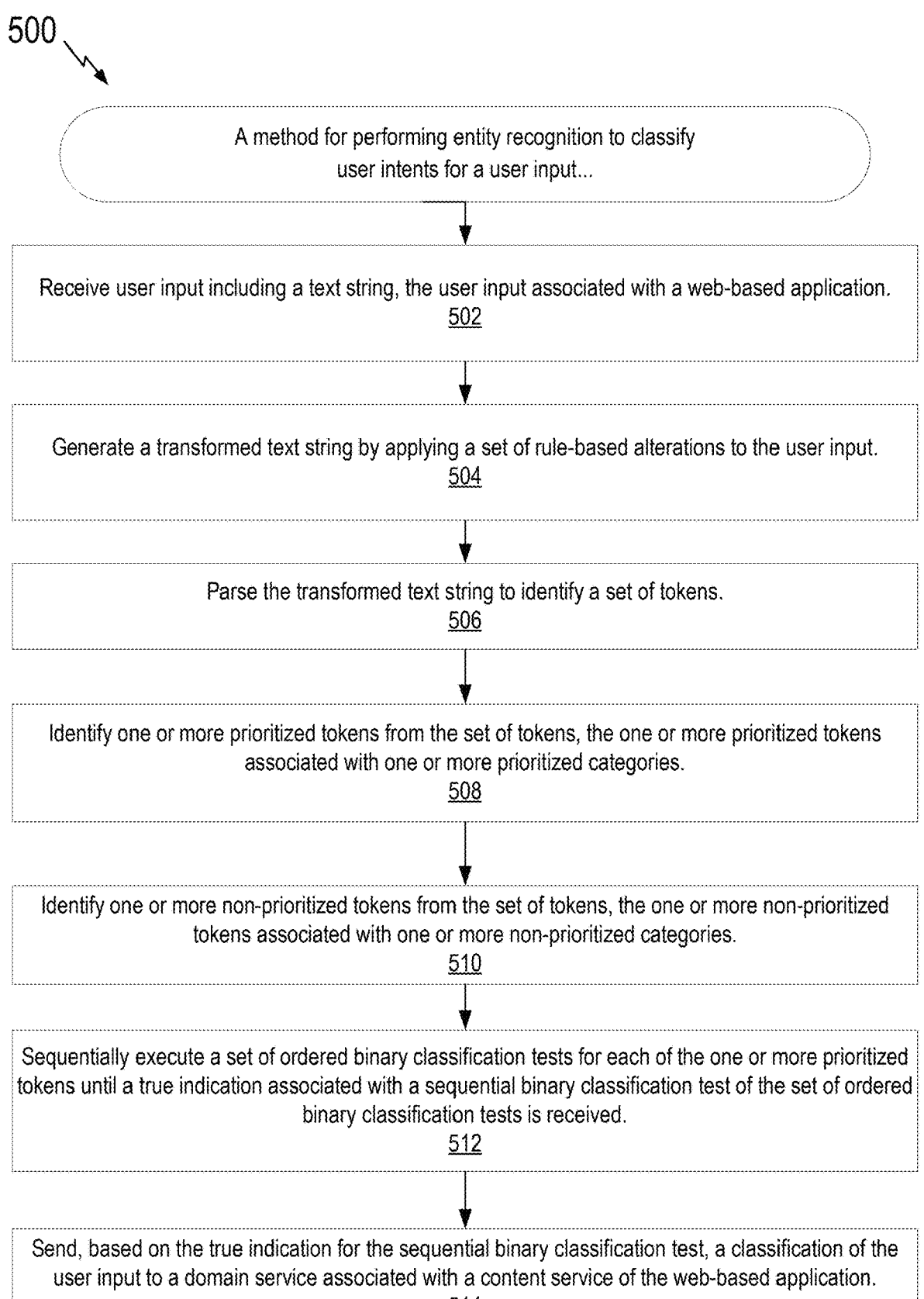

A method for performing entity recognition to classify
user intents for a user input...

Receive user input including a text string, the user input associated with a web-based application.
502

Generate a transformed text string by applying a set of rule-based alterations to the user input.
504

Parse the transformed text string to identify a set of tokens.
506

Identify one or more prioritized tokens from the set of tokens, the one or more prioritized tokens associated with one or more prioritized categories.
508

Identify one or more non-prioritized tokens from the set of tokens, the one or more non-prioritized tokens associated with one or more non-prioritized categories.
510

Sequentially execute a set of ordered binary classification tests for each of the one or more prioritized tokens until a true indication associated with a sequential binary classification test of the set of ordered binary classification tests is received.
512

Send, based on the true indication for the sequential binary classification test, a classification of the user input to a domain service associated with a content service of the web-based application.
514

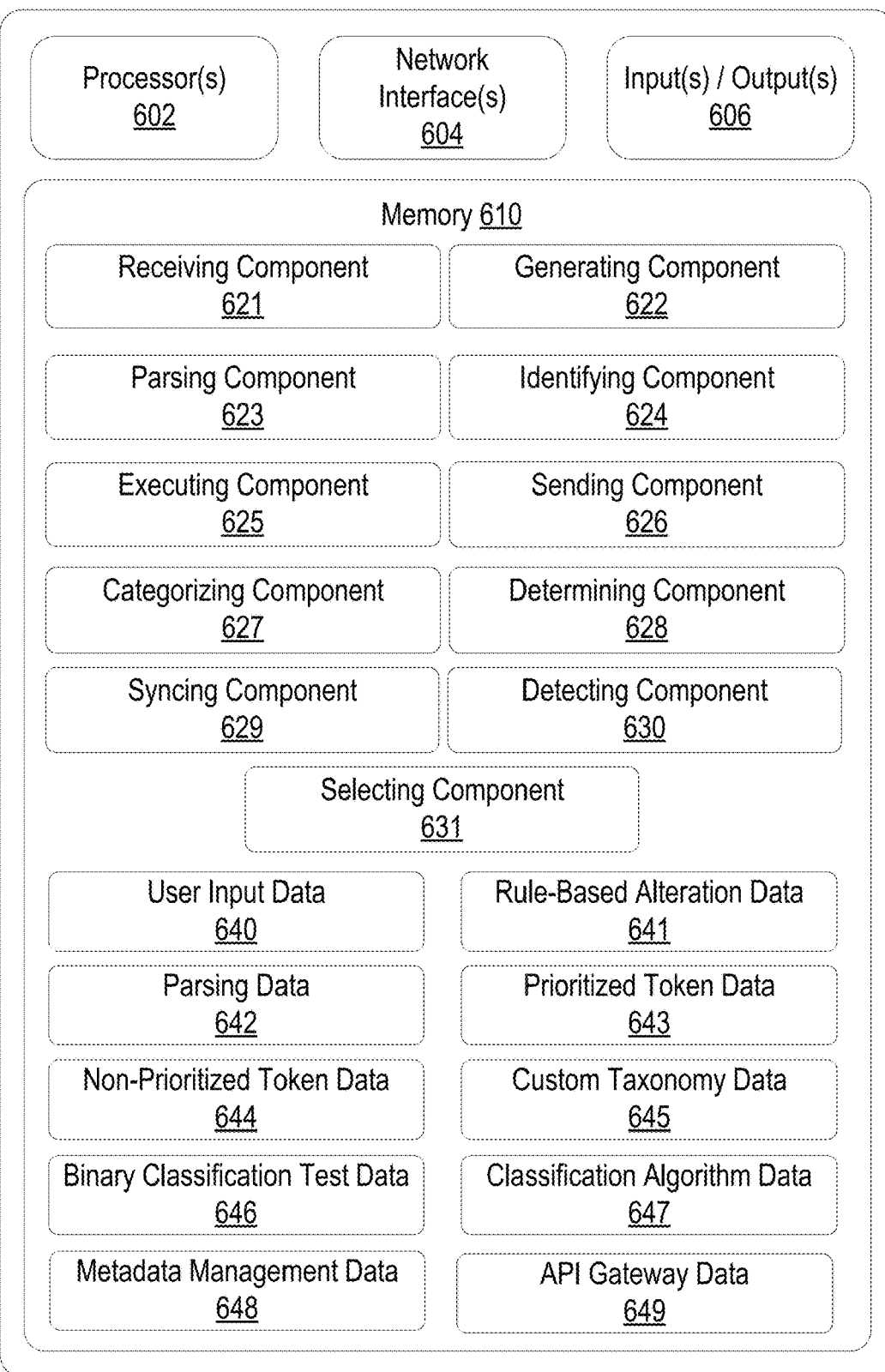

| Processor(s) 602 | Network Interface(s) 604 | Input(s) / Output(s) 606 |
|---|---|---|

Memory 610

| Receiving Component 621 | Generating Component 622 |
|---|---|
| Parsing Component 623 | Identifying Component 624 |
| Executing Component 625 | Sending Component 626 |
| Categorizing Component 627 | Determining Component 628 |
| Syncing Component 629 | Detecting Component 630 |

Selecting Component 631

| User Input Data 640 | Rule-Based Alteration Data 641 |
|---|---|
| Parsing Data 642 | Prioritized Token Data 643 |
| Non-Prioritized Token Data 644 | Custom Taxonomy Data 645 |
| Binary Classification Test Data 646 | Classification Algorithm Data 647 |
| Metadata Management Data 648 | API Gateway Data 649 |

*FIG. 6*

ENHANCED ENTITY RECOGNITION SERVICES FOR CLASSIFYING USER INTENTS

TECHNICAL FIELD

Aspects of the present disclosure relate to enhanced entity recognition services.

BACKGROUND

Entity recognition typically refers to a subtask of natural language processing that identifies and classifies entities within text into predefined categories. As an example, a user input including the text "Paris" may be classified as belonging to a predefined category of "Location". An Entity Recognition System (ERS) may be used to determine user intent and provide context for supporting a wide variety of downstream tasks. Improved techniques for implementing entity recognition services for more accurately identifying classifying entities within user inputs would be desirable for promoting more accurate and efficient user experiences across various domains, including search engines, virtual assistants, and content recommendation systems to name a few.

SUMMARY

One aspect provides a method for performing entity recognition to classify user inputs for resolving user intent, the method comprising: receiving user input comprising a text string associated, the user input associated with a web-based application generating a set of transformed text strings by applying a set of rule-based alterations to the user input; parsing a selected transformed text string from the set of transformed text strings to identify a set of tokens; identifying one or more prioritized tokens from the set of tokens, the one or more prioritized tokens associated with one or more prioritized categories; identifying one or more non-prioritized tokens from the set of tokens, the one or more non-prioritized tokens associated with one or more non-prioritized categories; sequentially executing a set of ordered binary classification tests for each of the one or more prioritized tokens until a true indication associated with a sequential binary classification test of the set of ordered binary classification tests is received; and sending, based on the true indication for the sequential binary classification test, a classification for the user input to a domain service associated with a content service of the web-based application.

Other aspects provide processing systems configured to perform the aforementioned method as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended FIGURES depict certain aspects and are therefore not to be considered limiting of the scope of this disclosure.

FIG. 2 depicts an illustrative process implemented by an ERS system for performing entity recognition to classify user inputs for resolving user intent according to one or more aspects.

FIG. 5 depicts an example method for performing entity recognition to classify user inputs for resolving user intent according to one or more aspects.

FIG. 6 depicts an example processing system for enabling an ERS system for performing entity recognition to classify user inputs for resolving user intent according to one or more aspects.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
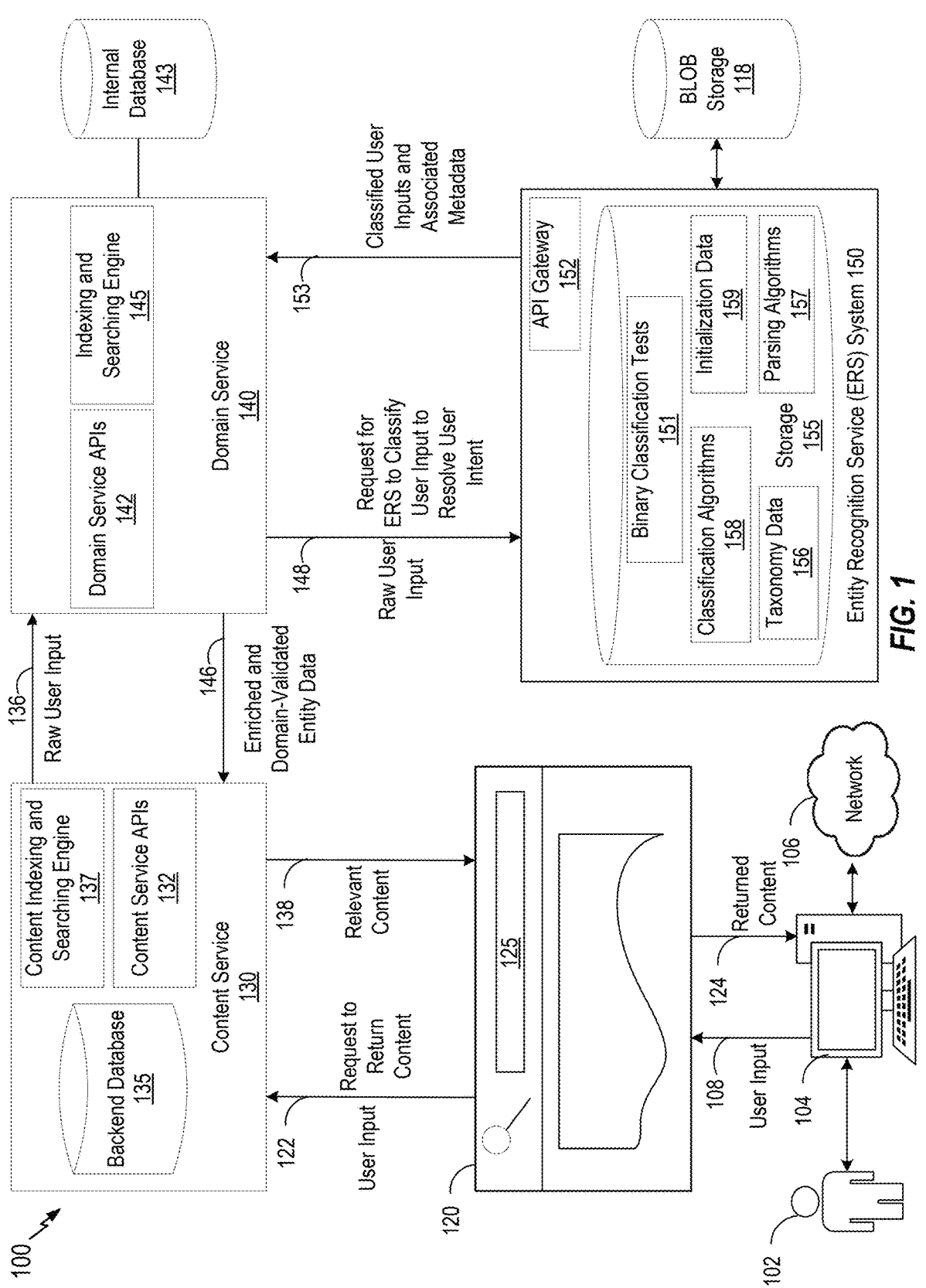
FIG. 1 depicts an illustrative environment for implementing an ERS system according to one or more aspects shown and described herein.

Aspects of the present disclosure provide apparatuses, methods, processing systems, and computer-readable mediums for performing enhanced entity recognition to classify user inputs for resolving user intent. Described aspects utilize linguistic rules and domain-specific linguistic knowledge for supporting classification algorithms for performing entity recognition to classify user inputs for resolving user intent derived from a web-based application employing described ERS systems. As an example, described aspects utilize a set of ordered binary classification tests based on a custom taxonomy configured to iteratively retrieve updated data at predetermined intervals. As used herein, the "custom taxonomy" refers to a hierarchical structure or framework that organizes user intents, domain-specific entities, and linguistic patterns into discrete, well-defined categories. The classified user intents and corresponding metadata are then provided to a domain service associated with a content service of the web-based application.

Performing entity recognition for resolving user intent associated with user inputs received from a web-based application that includes user querying or search functionalities involves numerous challenges. For example, a conventional ERS system may employ a fuzzy search algorithm for performing entity recognition to resolve user intents for user inputs received by a search window of a web-based application. However, while fuzzy search algorithms may be useful for simple matching tasks (e.g. token matching, similarity scoring, phonetic matching, etc.) and error-tolerant searches (e.g. accounting for variations in input such as spelling errors or alternative word forms), they often result in increased occurrences of irrelevant results (e.g., false positives) or missed relevant results (e.g., false negatives)

because they prioritize string similarity over semantic meaning. Conventional techniques for performing entity recognition may further demonstrate undesirable sensitivity to input variations related to spelling or to ambiguous user inputs. For example, a conventional ERS system employing a fuzzy search algorithm may classify a user input for a job board web application including the token "aid" as corresponding to a misspelled job title "Aide." However, the correct user intent was to use the token "aid" as a specifier for qualifying other tokens of a text string (e.g. an "aid worker") within a received user input. Conventional techniques further become more computationally expensive as datasets grow to have large numbers of potential entities to match, especially for conventional techniques that employ certain algorithms that are more sensitive to dataset size, such as Levenshtein Distance for measuring edit distance including a minimum number of single-character edits to turn one string into another.

Conventional techniques for performing entity recognition to classify user intents further generate limited metadata to enhance other downstream tasks that may benefit from the metadata. In addition, conventional techniques for performing entity recognition to classify user intents often lack the ability to handle user inputs written in different languages, failing to adapt the domain data considered for classification based on the language.

The above-described shortcomings of conventional techniques for performing entity recognition to classify user inputs for resolving user intent decrease accuracy in classification tasks, which can lead to providing incorrect or error-prone results to users of a given system employing an ERS system.

Aspects described herein provide a technical solution for the aforementioned technical problems by providing enhanced ERS systems and techniques that utilize linguistic knowledge, rather than statistical knowledge or keyword searching, to inform algorithm logic classifying user inputs to resolve user intent.

As an example, described aspects employ classification algorithms for leveraging a custom taxonomy including a hierarchical framework that organizes user intents, domain-specific entities, and linguistic patterns into discrete, well-defined categories usable for performing entity recognition to classify user inputs to resolve user intent. The custom taxonomy may further be updated at regular intervals with additional terms or relationships. Consistently updating custom taxonomy data provides described aspects with improved contextual understanding and domain adaptability for performing entity recognition to classify user inputs as compared to conventional techniques.

Described aspects may parse user input to identify prioritized and non-prioritized tokens. The prioritized tokens may then be used as inputs for executing a set of ordered binary classification tests of the custom taxonomy to resolves a user intent for a given user input. As used herein, a "binary classification test" refers to an evaluation for determining whether a piece of text (e.g. a token) matches with a given category of an employed taxonomy. A given binary classification test may return one of a "true" indication or a "false" indication for matching with a specific category or entity. By employing parsing techniques, described aspects simplify the set of tokens being considered and tested when performing entity recognition by omitting non-prioritized tokens. Thus, described aspects avoid the shortcomings of conventional entity recognition techniques, which can return inaccurate classifications based on considering non-prioritized tokens that include ambiguous or complex tokens.

In addition, described aspects are configured to determine a language of a user input to ensure the user input is parsed properly and to execute a set of ordered binary classification tests in a specific sequential order using a specific set of domain data based on the determined language. Described aspects utilize the determined language to provide enhanced overall quality and multilingual support when classifying user intents for web-based applications having a global base of users.

Described aspects for performing enhanced entity recognition to classify user inputs for resolving user intent provide various technical benefits and enhancements over conventional systems.

By using classification algorithms that directly operate on in-memory datasets, throughput in classifying user intents is beneficially increased as compared to conventional techniques, which often rely upon more complex logic (e.g., using structured query language (SQL) to retrieve data from relational databases) to search large datasets. For example, described aspects may store various classification algorithms and initialization data within local memory of a processing system usable for implementing described aspects.

Further, by parsing and determining prioritized tokens, aspects described herein reduce the computational burden and increase the speed of entity recognition processes as compared to conventional techniques.

Described aspects also utilize a set of ordered binary classification tests that are sequentially executed until a true indication corresponding to a match between a token of a user input that is being considered and a category or classification type of the custom taxonomy is returned. By halting the classification process as soon as a true indication is returned, described aspects minimize unnecessary computation and reduce power consumption.

Described aspects further provide for improved scalability as the classification algorithms are compatible with open-source container orchestration platforms capable of supporting horizontal scaling via multiple instances for handling more requests in less time (e.g., lower latency) while also ensuring high availability and load balancing as compared to conventional techniques. For example, horizontal scaling may allow for adding of more instances of an application in accordance with described aspects to a cluster by deploying additional containers or virtual machines.

In addition, described aspects are configured to create, log, and store relevant metadata associated with executed binary classification tests, thereby providing the technical benefit of generating valuable datasets for providing additional context and data to components or systems for performing downstream tasks that may benefit from the created metadata.

Example Systems and Methods for Performing Entity Recognition to Classify User Inputs FIG. 1 depicts an illustrative environment 100 for implementing an ERS system 150 according to one or more aspects shown and described herein.

ERS system 150 is configured to perform entity recognition to classify user inputs received by an illustrative web-based application 120 for resolving user intent. In certain aspects, web-based application 120 may support one or more professional development tools or functionalities (e.g.

via an application, a website, a platform, etc.). In some examples, web-based application 120 may enable users to build professional resumes, navigate online job postings, or build professional user profiles. Web-based application 120 includes a search box 125 for receiving user input (e.g., text strings) from a user 102. The user 102 may interface with the user interface of web-based application 120 via a device 104. In certain aspects, device 104 may be a personal computer, a tablet computer, a smart device (e.g., a smartphone), or the like. User 102 may access web-based application 120 using any suitable network 106 which may be a wide area network (WAN), such as the Internet, a local area network (LAN), or any other type of network connection, including a connection that spans multiple networks. As an example, user 102 may interact with web-based application 120 to build a resume, where search box 125 enables user 102 to search for relevant content to include within the resume.

At 108, user 102 sends user input to web-based application 120. At 122, upon receiving the user input, web-based application 120 sends the user input and a request to return content to content service 130. Content service 130 is configured to return (such as at 138) relevant content responsive to the received request. For example, if user 102's input is "Senior Project Manager", then web-based application 120 may send the user input and a request to content service 130 to generate and return relevant content related to the role of "Senior Project Manager." For example, if the web-based application 120 is an application for building a resume, the content service 130 may return example work experience excerpts associated with the job title "Senior Project Manager" for the user 102 to consider including within their resume.

To generate and return relevant content, content service 130 interfaces with a domain service 140 configured to return, as shown at 146, enriched and domain-validated entity data in a format that content service 130 uses to retrieve and return relevant content to the user. As used herein "enriched entity data" refers to entity data or associated metadata that is augmented with additional data, context, or attributes for making the data more actionable and relevant for content retrieval or user-interface personalization. Domain service 140 utilizes an indexing and searching engine 145 for providing a searchable index of additional domain data and metadata usable to return enriched and domain-validated entity data. For example, indexing and searching engine 145 of domain service 140 may store additional job titles, skills industries, or other relevant data (such as derived from data of internal database 143) within a searchable index. Domain service 140 may then use the indexing and searching engine 145 to fetch additional domain data and entity data from the searchable index for generating returning enriched entity data based on the received classified user inputs and associated metadata. At certain times, the enriched entity data may be obtained by domain service 140 aligning received classified user inputs and metadata with application-specific requirements of web-based application 120. In some examples, domain service 140 may further enrich data by utilizing domain service APIs 142 to query (via an API call) a third-party service to fetch additional data for enriching the received metadata.

As used herein, "domain-validated entity data" refers to entity data that has been checked and confirmed to align with rules, taxonomies, and specific requirements for a given web-based application's domain. Domain service 140 may validate received classified user inputs and associated metadata by cross-checking against the searchable index maintained by the indexing and searching engine 145. For example, if ERS system 150 returns an entity for a "Misspell" of a "Job Title" for "Softwar Enginer", the domain service may query the indexing and searching engine to confirm that the recognized entities from ERS system 150 are valid within the taxonomy or relevant domain data maintained in the searchable index.

Content service 130 is configured to utilize received enriched and domain-validated entity data to generate a structured query or request for retrieving relevant content from a backend database 135 that stores content to be returned. For example, content service 130 utilizes a content indexing and searching engine 137 to query a searchable index for returning relevant content at 138. The searchable index may be generated and maintained based on data derived from backend database 135. In some examples, content service 130 may utilize content service APIs 132 to interface with domain service 140. As an example, at 136, content service 130 sends the raw user input to domain service 140 via an API call.

Domain service 140 is further configured to interface with ERS system 150 (in this example through API gateway 152) to send a request, such as at 148, to ERS system 150 to classify received user inputs for resolving user intent. ERS system 150 returns classified user inputs and associated metadata, such as at 153, to domain service 140 for validating and enriching before it is passed back to content service 130. Illustrative processes performable by ERS system 150 to return classified user inputs and associated metadata are described in connection with an illustrative process 200 of FIG. 2.

ERS system 150 may be implemented on a processing system, such as processing system 600 of FIG. 6. ERS system 150 further includes storage 155 for storing data for performing classification, such as taxonomy data 156.

As an example, taxonomy data 156 may include various rules and mappings for specific categories of entities for a professional domain (e.g. job titles, skills, education and qualifications, locations, employers, etc.) that ERS system 150 may use to determine a classification for a given extracted entity of a user input. ERS system 150 is configured to utilize one or more classification algorithms for matching entity terms extracted from a user input against taxonomy data 156. For example, classification algorithms 158 may be configured to utilize a set of binary classification tests 151 for evaluating whether a token of a given text string (e.g. from a received user input) matches with a given category of a taxonomy (e.g. based on taxonomy data 156). As discussed, described aspects are configured to halt the classification process as soon as a "true" indication is returned, to minimize unnecessary computation and reduce power consumption. Though not shown in this example, storage 155 may be cloud storage accessible by ERS system 150.

ERS system 150 may be configured to regularly sync with an accessible Binary Large Object (BLOB) storage 118 to retrieve latest stored data for updating taxonomy data 156 for performing classification. As used herein "syncing" refers to transferring or sharing of information and data between two or more systems, devices, or components for keeping data consistent and updated between the different systems, devices, or components. In some examples, ERS system 150 may perform syncing via API calls sent using API gateway 152. An example process by which an illustrative custom taxonomy utilized by an ERS system 150 may be updated by syncing to retrieve updated data from BLOB storage 118 is described in greater detail below with reference to FIG. 4.

ERS system 150 further implements classification algorithms 158 for one or more languages (e.g., English, Spanish, etc.). Different, language-specific classification algorithms are useful for ensuring precise and accurate classification of user inputs based on leveraging language-specific datasets (such as contained within initialization data 159). For example, language-specific classification algorithms and corresponding language-specific datasets may account for linguistic variations (e.g. differing sentence structures, inflection, word order, etc.), cultural and contextual differences (e.g. in job titles, skills, certifications etc.), and different rules and lexicons. In certain aspects, different language-specific classification algorithms may be configured to utilize different tokenization rules for parsing, as rules for spacing between words, directionality (e.g. direction in which a language is read), and granularity of text representation (e.g. in Chinese or Japanese, a singular character may represent a full concept) may differ between languages. Initialization data 159 may be provided to ERS system 150 during an initialization process to obtain language-specific datasets for various linguistic data (for example, including above-described language-specific features and rules), career domain data (e.g. job titles, skills, industry information etc.), classification outputs (such as structured categories for different recognized entities), and behavior data (such as user behavior and input patterns for adapting to user preferences) for enabling illustrative processes for performing entity recognition according to described aspects.

ERS system 150 further implements parsing algorithms 157 (such as stored within storage 155) for parsing received user inputs. Parsing algorithms 157 are also language-specific, enabling described aspects to accurately and precisely parse received user inputs in different languages. Described aspects utilize parsing algorithms 157 to extract prioritized tokens and non-prioritized tokens from text strings of a received user input. ERS system 150 is configured to utilize binary classification tests to return classifications for prioritized tokens, while omitting non-prioritized tokens from consideration, thereby increasing efficiency by reducing unnecessary computation. Omitting non-prioritized tokens from consideration further increases classification accuracy by preventing consideration of certain tokens, which may provide misleading or unrelated context for nearby tokens of a given text string. Examples of illustrative parsing processes performable by described aspects to parse and categorize received inputs into prioritized and non-prioritized tokens are described in greater detail below in connection with 206-208 of illustrative process 200 of FIG. 2.

ERS system 150 may consume and obtain data required for performing described aspects during an initialization process. For example, during an initialization process, data related to each of binary classification tests 151, taxonomy data 156, parsing algorithms 157, classification algorithms 158, and initialization data 159 may be converted from binary data of BLOB storage 118 and filed into Comma-separate values (CSV) data for efficient storing within ERS system 150. In aspects, the data stored within BLOB storage 118 is already tagged and with a type and category such that ERS system 150 may consume and store the data during initialization for use in performing described techniques. In some examples taxonomy data 156, parsing algorithms 157, classification algorithms 158, and initialization data 159 may be wholly or partially stored within local memory (such as memory 610 of processing system 600 described below with reference to FIG. 6). This allows classification algorithms 158 to directly operate on in-memory datasets, thereby providing increased throughput in classifying received user inputs and resolving user intents as compared to conventional techniques to support faster processing during performance of illustrative processes for performing entity recognition to classify user inputs.

FIG. 2 depicts an illustrative process 200 implementable by an illustrative ERS system (such as ERS system 150 with reference to FIG. 1) for performing entity recognition to classify user inputs for resolving user intent according to one or more aspects.

At 202, the ERS system receives a user input, for example, using receiving component 621 with reference to FIG. 6. The user input includes a text string that may include one or more tokens. The received user input text string may be associated with any suitable web-based application (such as web-based application 120 with reference to FIG. 1) including any suitable mechanism for enabling a user to enter and submit a text string. For example, the web-based application may include a free-text search box, a chat interface, a voice input field for converting spoken inputs to text inputs, or any other suitable mechanism for allowing a user to input and submit a text string.

As described above, the ERS system receives the user input from a request received from a domain service (such as domain service 140 with reference to FIG. 1) that is associated with a content service for a web-based application. For example, the received user input may be passed using a series of API calls (for example using content service APIs 132 and domain service APIs 142) from the content service of the web based application, to an associated domain service, and then to an associated ERS system in accordance with described aspects for performing entity recognition to classify user inputs for resolving user intent. In certain other aspects, the received user input from the web-based application may be passed via API calls between the above-described services in different orders, or with certain services being omitted.

At 204, a set of transformed text strings is generated (for example, using generating component 622 with reference to FIG. 6) from the received user input. In some examples, described aspects are configured to apply rule-based alterations for generating a set of transformed text strings. Described aspects then generate the set of transformed text strings for facilitating parsing (for example, using parsing algorithms 157 with reference to FIG. 1) of the transformed text string, thereby enabling more accurate and precise classification of the user input.

In some examples, the classification algorithm employed by the ERS system for generating transformed text strings from the user input generates a first transformed text string by removing punctuation in the received text string. For example, a received user input stating "Sr. data analyst, level 2 #" is transformed by the ERS system to state "sr data analyst level 2".

The classification algorithm employed by the ERS system then generates a second transformed text string by expanding acronyms and abbreviations in the first intermediate text string. Using the previous example, "sr data analyst level 2" (the first intermediate text string) is used to generate a second intermediate text string "senior data analyst level 2" having the acronyms and abbreviations expanded.

A third transformed text string is then generated by removing spaces between words (i.e. normalizing) of the second intermediate text string. For example, the second transformed text string "senior data analyst level 2" may be used to generate a third transformed text string "senior-dataanalystlevel2". Generating a transformed text string having spaces removed standardizes user inputs before parsing and classification which may enhance algorithm efficiency by reducing tokenization overhead when parsing, and improve accuracy in parsing text strings for certain languages where words may not be separated by spaces At 206, described aspects then parses (for example, using parsing component 623 with reference to FIG. 6) a selected transformed text string to extract and identify a set of tokens therein. ERS systems in accordance with described aspects are configured to select a transformed text string for parsing that has a largest number of recognized tokens, for example using a selecting component 631 with reference to FIG. 6. For example, the ERS system may select a transformed text string for parsing by comparing a number of recognized tokens in each generated transformed text string, such as based on one or more of initialization data 159 and taxonomy data 156 described above with reference to FIG. 1. Described aspects then employ a parsing algorithm (such as one of parsing algorithms 157 described above with reference to FIG. 1) for extracting and identifying each token of the selected transformed text string. As discussed above, the parsing algorithms utilized by described aspects are language-specific. Accordingly, described aspects are configured to detect (for example, using detecting component 630 with reference to FIG. 6) a language of a user input to employ a given parsing algorithms for leveraging language-specific datasets (such as contained within initialization data 159 described above with reference to FIG. 1) to account for linguistic variations, cultural and contextual, and different rules and lexicons. Parsing algorithms employed by described aspects may further utilize different tokenization rules for parsing, such as rules for spacing between words, directionality (e.g. direction in which a language is read), and granularity of text representation (e.g. in Chinese or Japanese, a singular character may represent a full concept) may differ between languages.

At 208, described aspects categorize (for example, using categorizing component 627 with reference to FIG. 6) the tokens of the selected transformed text string. As an example, the parsing algorithm employed by described aspects matches the parsed tokens from the selected transformed text string against defined categories of a custom taxonomy (e.g. based on taxonomy data 156 described above with reference to FIG. 1) stored within memory of a processing system (such as memory 610 of processing system 600 described below with reference to FIG. 6) for implementing the ERS system. In some examples, the parsing algorithm employed by described aspects may leverage heuristics to determine a category for a token in instances where more than one candidate category is being considered, favoring the candidate category that returns a larger number of matches for one or more tokens based on the domain data (for example, contained within initialization data 159 described above with reference to FIG. 1).

As an example, the parsing algorithm employed by described aspects may categorize tokens of the selected transformed text string into one of four categories including "Job Titles", "specifiers", "stop words", or "ambiguous".

As used herein, "specifiers" refer to tokens within a text string for qualifying or describing another token of the text string. For example, if described aspects are categorizing tokens of a text string stating "Device Salesperson" including a categorized token for a job title "Salesperson", it may then categorize the token "Device" as being a specifier for qualifying or describing the job title of "Salesperson".

As used herein, "stop words" refer to a category of tokens that are considered to lack content or semantic meaning for the task of resolving user intent for a received user input. In some examples, described aspects employ parsing algorithms configured to categorize prepositions, conjunctions, and articles as "stop words" having limited semantic meaning or content for resolving user intent.

As used herein "ambiguous" refers to a category for tokens that are associated with more than one available category. As an example, the token "Volunteer" may be associated with both the categories of "Job Title" and "Specifier". In the job title "Volunteer Firefighter", the token "Volunteer" may be categorized as a specifier describing a firefighter who is not paid, while in the job title "Crisis Center Volunteer", the token "Volunteer" is categorized as a job title for a person who volunteers time at a crisis center.

In some examples, parsing algorithms employed by ERS systems in accordance with described aspects may further be configured to categorize certain tokens of the selected transformed text string as "unknown" for tokens that do not match any linguistic or domain data, such as career domain data.

In an illustrative example below, described aspects employ the parsing algorithm to categorize tokens of a transformed text string into one of four categories including job titles ('jt'), specifiers ('spec'), stop words ('stop') and ambiguous (amb) as depicted in the following illustrative examples for a received user input stating "senior manager at a software company":

```
1 Parse_input ('senior manager at a software company')
   ({
      0: {'end': 2, 'text': 'senior manager', 'type': 'jt'},
      2: {'end': 3, 'text': 'at', 'type': 'stop'},
      3: {'end': 4, 'text': 'a', 'type': 'stop'},
      4: {'end': 5, 'text': 'software', 'type': 'spec'},
      5: {'end': 6, 'text': 'company, 'type': 'spec'}},
```

In the illustrative example above, the parsing algorithm employed by described aspects combines the first pair of tokens and categorizes "senior manager" as a job title based on matching the tokens to domain data and linguistic data retrieved during the initialization process (e.g. contained within initialization data 159 described above with reference to FIG. 1). The parsing algorithm then categorizes the tokens for the words "at" and "a" as stop words having no relevant content or semantic meaning for resolving user intent. The parsing algorithm further categorizes the tokens for the words "software" and "company" as specifiers that describe or provide context for the categorized job title.

At 210, described aspects sequentially execute (for example, using executing component 625 with reference to FIG. 6) a set of ordered binary classification tests. The set of ordered binary classification tests are configured to return one of two returnable indications, including either a "true" indication or a "false" indication. The binary classification tests may be sequentially ordered based on one or more factors, including but not limited to, a determined language for the received input and a category for the tokens being considered. As an example, described aspects may sequentially execute a first binary classification test for determining whether there is an exact match for the tokens being considered. Described aspects are further configured to only utilize prioritized tokens for executing the ordered binary classification tests. For example, using the token categories from the example discussed above with reference to 208, the illustrative "Job Title" and "Specifier" categories may be associated with prioritized tokens for executing the ordered binary classification tests, while the "Stop words" and "Ambiguous" categories may be associated with non-prioritized tokens to be omitted from consideration.

As discussed above, described aspects leverage a custom taxonomy (for example, including taxonomy data 156 described above with reference to FIG. 1). For example, if described aspects are being employed to classify received user inputs for a web-based application for assisting users with building professional resumes, the custom taxonomy may organize job titles, skills, education, employers, and other relevant entities into hierarchical categories, incorporating linguistic patterns, synonyms, contextual relationships, and any other linguistic or domain data.

The custom taxonomy may include categories and relationships for various entities based on a variety of different considered data. For example, the taxonomy data may be based on domain data including specialized knowledge or information specific to a given domain (e.g. job titles, skills, industries, education etc, for a resume building domain). The taxonomy data may further be based on linguistic data for providing synonyms, spelling variations, abbreviations, and other semantic relationships. In aspects, the taxonomy data includes classification outputs including results or outcomes of past classification processes for user inputs by assigning labels or categories to user inputs. The taxonomy data may further be based on behavior data including rules or logic for defining how entities in the taxonomy should behave or interact during processing and classification (e.g., a rule may define that if a received input contains "Engineering" the ERS system should prioritize classification under a "Job Title" rather than a "Skill").

Described aspects input prioritized tokens of a received user input into binary classification tests for comparing the prioritized tokens against the taxonomy data of an employed custom taxonomy. The custom taxonomy used by described aspects is further updated at predetermined interval (as described in greater detail below with reference to FIG. 4), providing the benefit of further increasing accuracy and precision in classification tasks over time as additional categories, linguistic knowledge, and domain data are added to the custom taxonomy.

At 212, described aspects determine (for example, using determining component 628 with reference to FIG. 6) whether a "true indication" has been received for the executed binary classification test. If a "false" indication is returned, described aspects will return to step 210 and execute a next sequential binary classification test. For example, if the first sequential binary classification test for determining whether the custom taxonomy includes an "exact match" for the token returns a "false" indication, then described aspects execute a second sequential binary classification test for determining whether the token can be classified as a "Misspell". As used herein a classification of "Misspell" corresponds to a token of a received user input that is the same or similar to a misspelled version of the token contained within the custom taxonomy. Described aspects will continue sequentially executing the ordered binary classification tests until a "true" indication is returned.

Figure 3:
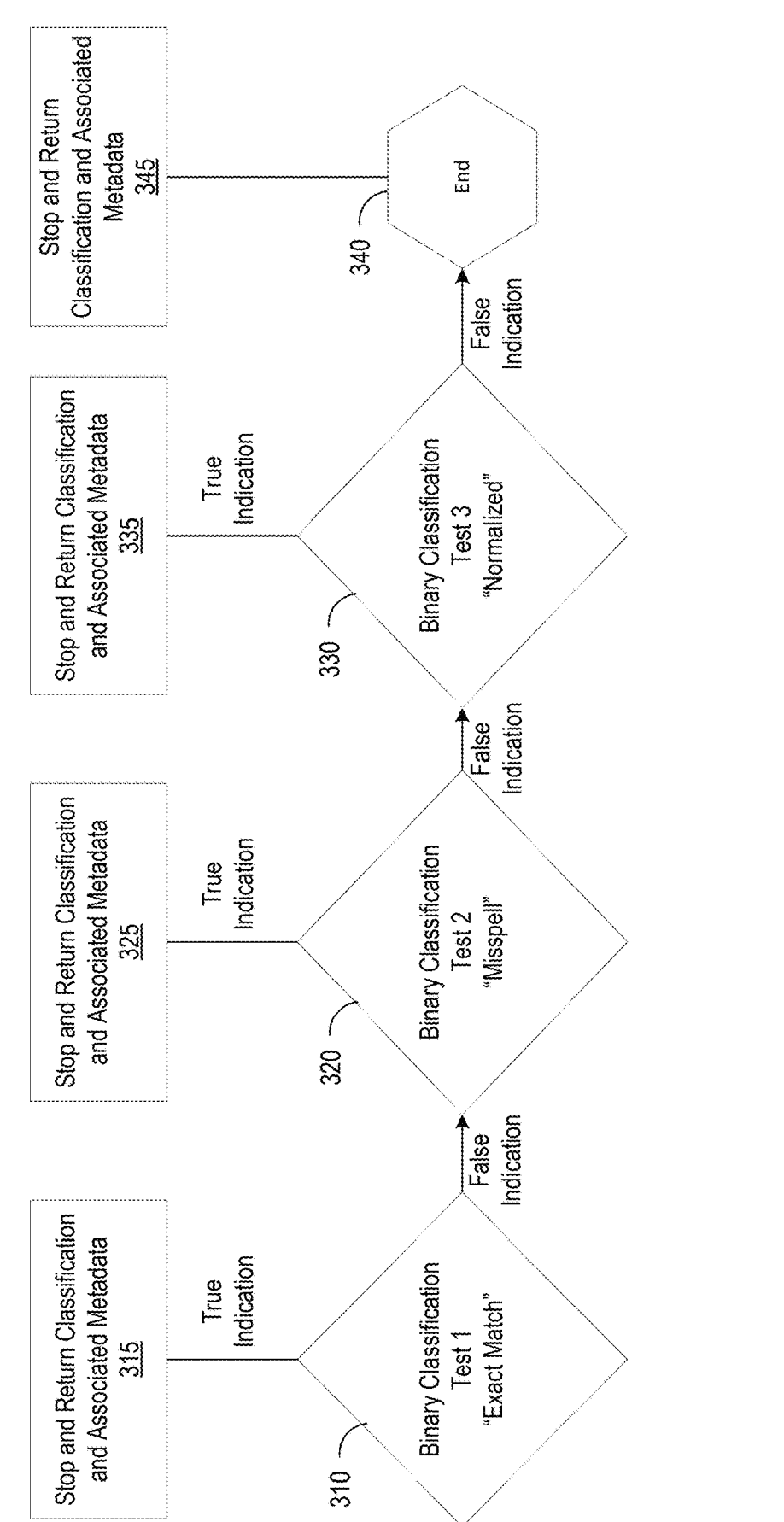
FIG. 3 depicts an illustrative set of ordered binary classification tests that may be implemented by an illustrative ERS system in accordance with described aspects

FIG. 3 depicts an illustrative portion of a set of ordered binary classification tests 300 that may be implemented by an illustrative ERS system in accordance with described aspects. The set of ordered binary classification tests 300 includes a first binary classification test 310 for determining whether an input prioritized token has an "exact match" with an entity of the custom taxonomy (such as based on taxonomy data 156 described above with reference to FIG. 1). For example, a prioritized token "Physician" may have an exact match within the custom taxonomy for a job title "physician". If binary classification test 310 returns a true indication, then the ERS system will, at 315, stop and return the classification for the prioritized token and any associated metadata generated during the classification process. If binary classification test 310 instead returns a false indication, then the ERS system will proceed with executing a next sequential binary classification test 320 of the set of ordered binary classification tests 300 for determining whether the prioritized token matches with an entity of the custom taxonomy categorized as a misspelling of an entity. For example, a received user input "Physicin" may correspond to an entity of the custom taxonomy categorized as a misspelling of the job title "Physician", thereby causing binary classification test 320 to return a true indication. The ERS system then proceeds to 325 to stop and return the classification (a misspelling) for the prioritized token and associated metadata based on the returned true indication for binary classification test 320. A third binary classification test 330 for determining whether a prioritized matches with a normalized entity stored within the custom taxonomy can similarly cause ERS system to stop and return a classification for the prioritized token and associated metadata at 335 in response to binary classification test 330 returning a true indication. The set of ordered binary classification tests 300 may terminate at an "end" 340 corresponding to a terminal classification of "uncategorized" configured to return a true indication for any prioritized token that has not returned a true indication for any previous sequential binary classification test. Accordingly, upon reaching "end" 340, the prioritized token being considered will be classified as "uncategorized" and the sequential execution of binary classification tests 300 is complete. The ERS system may then, at 345, stop and return the classification of "uncategorized" and any associated metadata. The set of ordered binary classification tests 300 are merely illustrative, and any number of additional binary classification tests may be added or substituted as may be advantageous for classifying various received user inputs using the above-described methods and data.

By executing the set of ordered binary classification tests one at a time, based on which tests are more likely to return a "true" indication (e.g. based on the detected language and a corresponding order) and halting the classification process as soon as a true indication is returned, described aspects minimize unnecessary computation and reduce consumption. Described aspects further reduce power consumption and unnecessary computation by only performing the ordered binary classification tests using a set of prioritized tokens while omitting the non-prioritized tokens from consideration.

Described aspects are configured to determine an order in which to execute the set of ordered binary classification tests based on a detected relevant language from the illustrative parsing process described above. For example, a given language may prioritize certain linguistic patterns affecting which binary classification tests are more likely to succeed first. The order of the binary classification tests may further be based on consideration of possible errors and classification frequencies. As an example, binary classification tests involving commonly misunderstood or error-prone inputs may be deprioritized, while binary classification tests related to tokens or attributes with higher occurrence may be prioritized to maximize efficiency and minimize unnecessary compute. In certain aspects, users of ERS systems in accordance with described aspects may utilize a taxonomy management tool to provide updated binary classification tests and updated sequential orders for use by described ERS systems, such as taxonomy management tool 420 for providing updated data to BLOB storage 440 described below with reference to FIG. 4. The ERS system may then sync with the BLOB containing the updated binary classification tests having language-specific ordering to ensure most updated binary classification tests are utilized in a proper order. In some examples, manually configured orderings of the binary classification tests may be further provided and stored within data associated with the classification algorithms (such as classification algorithms 158 with reference to FIG. 1) to ensure the classification techniques performed by the ERS system utilize the language-specific orderings for a determined language. In certain aspects, the ordering of the binary classification tests may further be based on other features related to a user base of a web-application employing ERS systems in accordance with described aspects, such as based on an input type or behaviors associated with a user base of an example web-application 120 described above with reference to FIG. 1. In other aspects, the ordering of the binary classification tests may be adjusted to reflect features specific to a given region for a web-application or portal employing described ERS systems, such as a country or a state.

Returning to illustrative process 200, at 214, the ERS system send (for example, using sending component 626 with reference to FIG. 6), based on receiving the "true" indication, the classification of the user input and any associated metadata to the domain service (such as domain service 140 with reference to FIG. 1). In some examples, the associated metadata may further include remediating information for fixing an error with the user input based on the classification. For example, if described aspects consider user input including a text string "Project Managr", the executed ordered binary classification test may return a "true" indication for a classification of "Misspell" based on a job title "Manager" contained within the custom taxonomy utilized by described aspects. Accordingly, when returning the classification to the domain service, described aspects may further include remediating information including the properly spelled job title "Manager", for providing additional context and information for downstream tasks, such as generating content at the content service associated with the web-based application from which the user input originated.

Described aspects may include any number of additional binary classification tests for performing entity recognition to classify user inputs for resolving user intent based on comparing one or more prioritized tokens to data of the custom taxonomy. For example, binary classification tests may be configured to identify and classify received user inputs for a web-based application for building resumes that include classifications for prioritized tokens that may be categorized as normalized (e.g. matching an entity in the taxonomy with spaces removed), partial entities (e.g. a partial job title), unfinished (e.g. accurate but for one or more missing characters), a job title specifier (e.g. for describing or qualifying a job title), a number specifier, multiple job titles, a transformation, a partial misspell, an internship, an international match (e.g. matching an entity of the taxonomy that is associated with a language different from a default language for a receiving portal or web-based application), an international variant, multiple job titles international (e.g. including multiple job titles in a language different from a default language for a receiving portal or web-based application), partial job title international (e.g.

including a partial job title in a language different from a default language for a receiving portal or web-based application), job title specifier international (e.g. including job title specifiers in a language different from a default language for a receiving portal or web-based application), a job task, only specifier, skills, mistakes (e.g. typos or nonsensical text), employer, misspelled employer, normalized employer, employer ending, nonsensical text, location, education, service, no current job, foreign character, not suitable for work (e.g. tokens that are not suitable for returning professional content), work setting, certification, generic skill, or uncategorized (e.g. including tokens that have no matching or similar entities within the custom taxonomy). Described aspects may include any number of additional classifications as may be suitable for different domains or use-cases.

At 216, described aspects send (for example, using sending component 626 with reference to FIG. 6) the classification for the user input, and any associated metadata, to suitable storage. In some examples, described aspects may send (i.e. return to the domain service) a classification and associated metadata for each respective identified prioritized token within a given text string of a received user input. Described aspects further generate a variety of metadata while performing illustrative process 200. In some examples, described aspects are configured to log metadata associated with the classification for the user input that includes a category, or entity type for the classification, such as an "Exact Match", a "Misspell", or a "Normalized" user input.

In another example, the metadata generated and stored by described aspects further includes a binary classification test identifier. The binary classification test identifier includes a unique identifier (e.g. numeric identifier) associated with each unique binary classification test. For example, a binary classification test for an "Exact Match" may be associated with a binary classification test identifier "1".

In some examples, the metadata generated and stored by described aspects further includes entity information corresponding to the user input. For example, described aspects may generate metadata including an "Entity"; "Cashier" for a received user input including the token "Cashier". Described aspects may further generate and store metadata indicating a language for received user input. For example, described aspects may generate metadata for a received input including the token "Cashier" for indicating that the relevant language is English with metadata including a "Culture" corresponding to "en-US".

Once described aspects generate, log, and categorize the metadata, it is then sent to suitable storage (such as storage 155 with reference to FIG. 1) for use by the ERS system or other systems having access to the storage. In certain aspects, the logged and categorized metadata is stored in tabular format within suitable cloud storage.

Figure 4:
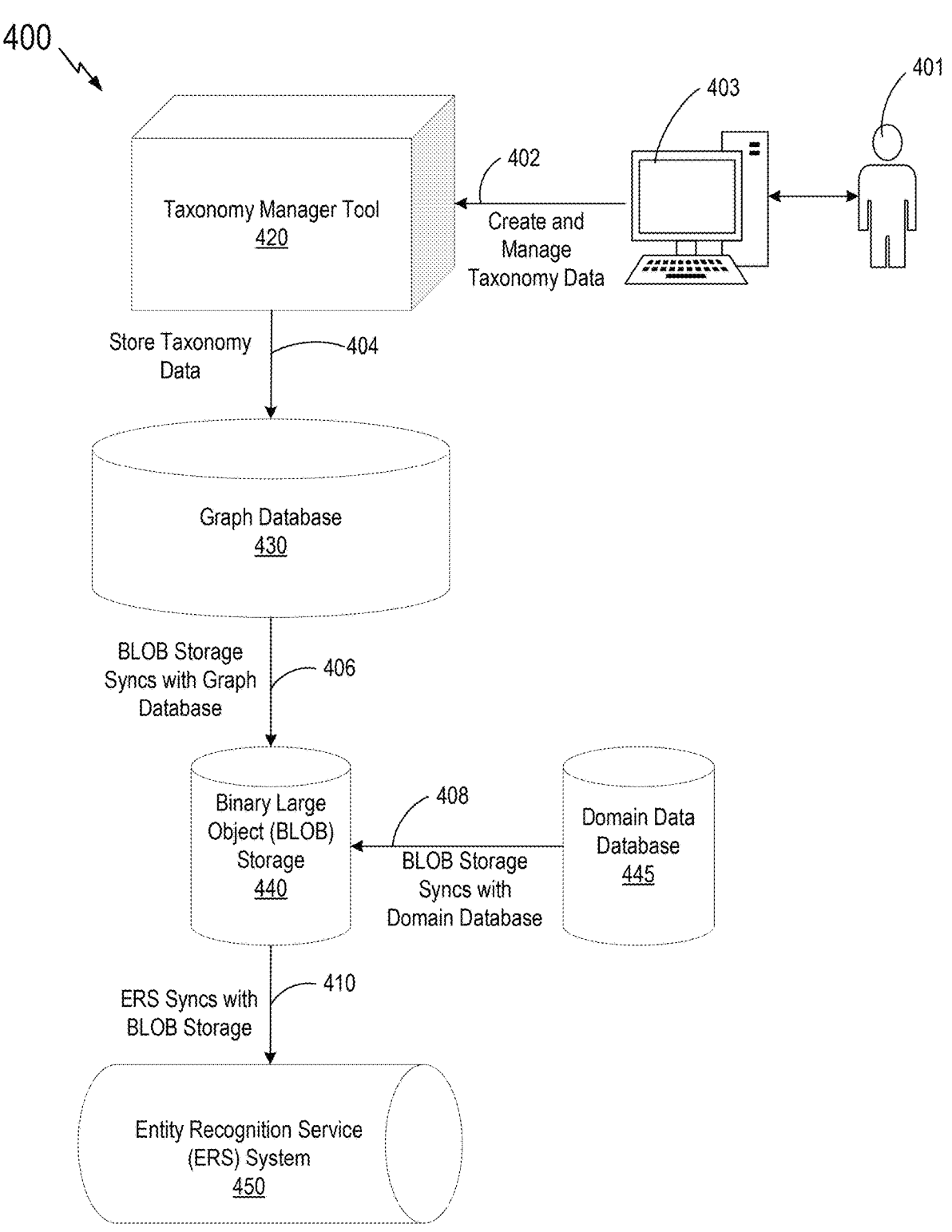
FIG. 4 depicts an illustrative process for updating a custom taxonomy employed by an ERS system for performing entity recognition to classify user inputs for resolving user intent according to one or more aspects.

FIG. 4 depicts an illustrative process 400 for updating a custom taxonomy employed by an ERS system for performing entity recognition to classify user inputs for resolving user intent according to one or more aspects.

At 402, an illustrative user 401 (e.g. a taxonomist), using a device 403 for interfacing with a user interface of a taxonomy management tool 420, creates and manages taxonomy data for updating the custom taxonomy.

Taxonomy management tool 420 may include any suitable software for creating, organizing, maintaining, and managing new or existing taxonomy data made available to taxonomy management tool 420. The new taxonomy data may include newly created entities (e.g. job titles, education, occupations, etc.), new hierarchies and relationships between entities (e.g. "Software Engineer" is a child of "Engineer" which is categorized as a "Job Title"), synonyms, aliases, and any other linguistic knowledge or domain data as may be useful for providing additional data to the custom taxonomy. In certain aspects, data sourced from suitable storage associated with the web-based application is imported into taxonomy management tool 420 by user 401. In some aspects, data sourced from a web-based application is automatically sent to taxonomy management tool for consideration by taxonomists (such as user 401). For example, taxonomy management tool 420 may be configured to perform scheduled syncing processes with suitable storage of the web-based application employing described aspects to retrieve historical data including entity data, received user inputs, corresponding metadata, and any other available data as may be useful for updating the custom taxonomy.

At 404, user 401 utilizes taxonomy management tool 420 to store the taxonomy data within a graph database 430. Graph database 430 may include any suitable graph database for using nodes (e.g. for representing entities like "Job titles", "Skills" and "Employers", and relationships (e.g. defining connections between entities, such as "Software Engineer" Job title being related to "Python" skills) to store the taxonomy data received from taxonomy management tool 420. Graph databases used by described aspects may be schema-agnostic and are better able to accommodate evolving taxonomies including new entities and relationships as compared to conventional relational databases, thereby providing the technical benefit of reducing computational costs of frequent and complex updates to the custom taxonomy. For example, adjusting relationships within a graph database (e.g. adding "related skills") can be done without altering an overall database schema or reworking the database. Similarly, nodes can be merged or split to avoid disruption of other portions of the taxonomy.

At 406, BLOB storage 440 syncs with graph database 430 to retrieve the stored taxonomy data from graph database 430 in preparation for updating the custom taxonomy. BLOB storage 440 further acts as a backup to ensure data is not lost during updating of the custom taxonomy, serving as a buffer and control point for ensuring the new taxonomy data is accurate, auditable, and robust before it is pushed to the custom taxonomy. Use of BLOB storage 440 further decouples graph database 430 from direct update operations, thereby providing the benefit of increasing reliability (e.g. by reducing risk of system failures through distributed processing) and scalability.

At 408, BLOB storage 440 further syncs with a domain data database 445 to pull additional domain data and linguistic data from domain data database 445. As an example, domain data database 445 may include data that is manually uploaded by one or more users (e.g. taxonomists) tasked with providing additional entities, relationships, linguistic knowledge, or other domain data for ensuring the custom taxonomy is kept up to date.

At 410, an entity recognition system 450 according to described aspects syncs (for example, using syncing component 629 with reference to FIG. 6) with BLOB storage 440 to pull any new data for updating an employed custom taxonomy. For example, entity recognition system 450 may pull may pull, from BLOB storage 440, taxonomy data originating from taxonomy management tool 420 and manually uploaded taxonomy data originating from domain data database 445 for updating a custom taxonomy stored within suitable storage (such as storage 155 of ERS system 150 with reference to FIG. 1). In certain aspects, the syncing processes performed throughout illustrative process 400 are scheduled to automatically occur at regular time intervals (e.g. every 12 hours).

Thus, described aspects automatically sync with above-described components to continually ingest new taxonomy data (sourced from both taxonomy management tool 420 and domain data database 445) for updating a custom taxonomy, thereby providing increased precision and accuracy in classifying user intents based on increasing the volume of available data and corresponding derived context.

Example Method for Performing Entity Recognition to Classify User Inputs for Resolving User Intent FIG. 5 depicts an example method 500 for performing entity recognition to classify user inputs for resolving user intent according to one or more aspects.

Method 500 begins at block 502 with receiving user input comprising a text string, the user input associated with a web-based application. For example, block 502 may be performed by the one or more processing systems 600 described below with reference to FIG. 6, configured to implement components including, but not limited to, a receiving component 621.

Method 500 proceeds to block 504 with generating a transformed text string by applying a set of rule-based alterations to the user input. For example, block 504 may be performed by the one or more processing systems 600 described below with reference to FIG. 6, configured to implement components including, but not limited to, a generating component 622.

Method 500 proceeds to block 506 with parsing the transformed text string to identify a set of tokens. For example, block 506 may be performed by the one or more processing systems 600 described below with reference to FIG. 6, configured to implement components including, but not limited to, a parsing component 623.

Method 500 proceeds to block 508 with identifying one or more prioritized tokens from the set of tokens, the one or more prioritized tokens associated with one or more prioritized categories. For example, block 508 may be performed by the one or more processing systems 600 described below with reference to FIG. 6, configured to implement components including, but not limited to, an identifying component 624.

Method 500 proceeds to block 510 with identifying one or more non-prioritized tokens from the set of tokens, the one or more non-prioritized tokens associated with one or more non-prioritized categories. For example, block 510 may be performed by the one or more processing systems 600 described below with reference to FIG. 6, configured to implement components including, but not limited to, the identifying component 624.

Method 500 proceeds to block 512 with sequentially executing a set of ordered binary classification tests for each of the one or more prioritized tokens until a true indication associated with a sequential binary classification test of the set of ordered binary classification tests is received. For example, block 512 may be performed by the one or more processing systems 600 described below with reference to FIG. 6, configured to implement components including, but not limited to, an executing component 625.

Method 500 proceeds to block 514 with sending, based on the received true indication for the sequential binary classification test, a classification for the user input to a domain service associated with a content service of the web-based application. For example, block 514 may be performed by the one or more processing systems 600 described below with reference to FIG. 6, configured to implement components including, but not limited to, a sending component 626.

In some aspects, method 500 further includes sending metadata to the domain service, wherein the metadata is associated with one or more of the classification for the user input, a binary classification test identifier, a language for the user input, and entity information corresponding to the user input.

In some aspects, method 500 further includes generating a first transformed text string by removing punctuation in the text string; generating a second transformed text string by expanding acronyms and abbreviations in the first transformed text string; and generating third transformed text string by removing spaces between words in the second transformed text string.

In some aspects, method 500 further includes determining a language of the selected transformed text string; and parsing the selected transformed text string to categorize the set of tokens based on the determined language, wherein the set of ordered binary classification tests are ordered based on the determined language of the selected transformed text string.

In some aspects, method 500 further includes sequentially executing the set of the ordered binary classification tests using a classification algorithm for leveraging one or more datasets of a custom taxonomy, the custom taxonomy based on domain data, linguistic data, classification outputs, and behaviors, wherein the classification algorithm and the one or more datasets each correspond to the determined language of the user input.

In some aspects, method 500 further includes logging a dataset comprising data associated with one or more of, the user input, the transformed text string, the classification, and the metadata associated with the classification; categorizing the data of the dataset; and sending the logged and categorized data of the dataset to a storage component.

In some aspects, sequentially executing the set of the ordered binary classification tests further includes using a classification algorithm for leveraging data of a taxonomy to receive the classification for the user input.

In some aspects, method 500 further includes updating the taxonomy by iteratively syncing, at predetermined intervals, the taxonomy with taxonomy data of an accessible binary large object storage, wherein the accessible binary large object storage is configured to sync with a graph database associated with a taxonomy management tool.

In some aspects, the set of ordered binary classification tests comprise tests for categorizing one or more of job titles, skills, and employers.

In some aspects, the entity information corresponding to the user input comprises remediating information for fixing an error associated with the user input.

Method 500 thus provides technical solutions to overcome shortcomings of conventional techniques for performing entity recognition to classify user intent for a user input. For example, in certain aspects method 500 utilizes linguistic knowledge, rather than statistical knowledge or keyword searching, to inform algorithm logic for parsing text strings to identify prioritized and non-prioritized tokens. The prioritized tokens may then be used to execute a set of ordered binary classification tests, to resolves the user intent for a corresponding user input based on leveraging of a custom taxonomy including domain data, linguistic data, classification outputs, and behaviors. Thus, method 500 enables leveraging of linguistic knowledge and enhanced semantic understanding to simplify the set of tokens being considered and tested, thereby avoiding the shortcomings of conventional entity recognition techniques which can return inaccurate classifications based on considering even non-prioritized tokens that include ambiguous or complex tokens. In some aspects, method 500 further includes determining a language of a text string associated with a user input to ensure the user input is parsed properly and to execute a set of ordered binary classification tests using an order and corresponding domain data that are each based on the determined language, thereby enabling described aspects to provide enhanced overall quality and multilingual support in classifying user intents for received inputs of web-based applications having a global base of users.

FIG. 5 is just one example of a method, and other methods including fewer, additional, or alternative steps are possible consistent with this disclosure.

Example Processing System for Performing Entity Recognition to Classify User Inputs for Resolving User Intent FIG. 6 depicts an example processing system 600 upon which one or more aspects shown and described herein may be implemented.

The processing system 600 includes one or more processors 602. Generally, processor(s) 602 may be configured to execute computer-executable instructions (e.g., software code) to perform various functions, as described herein.

The processing system 600 further includes a network interface(s) 604, which generally provides data access to any sort of data network, including personal area networks (PANs), local area networks (LANs), wide area networks (WANs), the Internet, and the like.

The processing system 600 further includes input(s) and output(s) 606, which generally provide means for providing data to and from the processing system 600, such as via connection to computing device peripherals, including user interface peripherals.

The processing system 600 further includes a memory 610 configured to store various types of components and data.

In this example, memory 610 includes a receiving component 621, a generating component 622, a parsing component 623, an identifying component 624, an executing component 625, a sending component 626, a categorizing component 627, a determining component 628, a syncing component 629, a detecting component 630, and a selecting component 631.

Receiving component 621 may be configured to perform processes, for example, corresponding to block 502 of method 500 described above with reference to FIG. 5. Receiving component 621 may further be configured to perform processes, for example, corresponding to 202 of process 200 described above with reference to FIG. 2.

Generating component 622 may be configured to perform processes, for example, corresponding to block 504 of method 500 described above with reference to FIG. 5. Generating component 622 may further be configured to perform processes, for example, corresponding to 204 of process 200 described above with reference to FIG. 2.

Parsing component 623 may be configured to perform processes, for example, corresponding to block 506 of method 500 described above with reference to FIG. 5. Parsing component 623 may further be configured to perform processes, for example, corresponding to 206 of process 200 described above with reference to FIG. 2.

Identifying component 624 may be configured to perform processes, for example, corresponding to blocks 508 and 510 of method 500 described above with reference to FIG. 5.

Executing component 625 may be configured to perform processes, for example, corresponding to block 512 of method 500 described above with reference to FIG. 5. Executing component 625 may further be configured to perform processes, for example, corresponding to 210 of process 200 described above with reference to FIG. 2.

Sending component 626 may be configured to perform processes, for example, corresponding to block 514 of method 500 described above with reference to FIG. 5. Sending component 626 may further be configured to perform processes, for example, corresponding to 214 and 216 of process 200 described above with reference to FIG. 2. As an example, sending component 626 may be configured to enable performing processes corresponding to API gateway 152 with reference to FIG. 1.

Categorizing component 627 may be configured to perform processes, for example, corresponding to 208 of process 200 described above with reference to FIG. 2.

Determining component 628 may be configured to perform processes, for example, corresponding to 212 of process 200 described above with reference to FIG. 2.

Syncing component 629 may be configured to perform processes, for example, corresponding to 420 of process 400 described above with reference to FIG. 4.

Detecting component 630 may be configured to perform processes for detecting a language of a received user input, for example, corresponding to 206 of process 200 described above with reference to FIG. 2.

Selecting component 631 may be configured to perform processes for selecting a generated transformed text string from a generated set of transformed text strings, for example, corresponding to 206 of process 200 described above with reference to FIG. 2.

In this example, memory 610 also includes user input data 640, rule-based alteration data 641, parsing data 642, prioritized token data 643, non-prioritized token data 644, custom taxonomy data 645, binary classification test data 646, classification algorithm data 647, metadata management data 648, and API gateway data 649.

The processing system 600 may be implemented in various ways. For example, the processing system 600 may be implemented within on-site, remote, or cloud-based computing devices.

The processing system 600 is just one example, and other configurations are possible. For example, in alternative aspects, aspects described with respect to the processing system 600 may be omitted, added, or substituted for alternative aspects.

Example Clauses

Implementation Examples are Described in the Following Numbered Clauses:

Clause 1: A method for performing entity recognition to classify user inputs for resolving user intent, the method comprising: receiving user input comprising a text string associated, the user input associated with a web-based application; generating a set of transformed text strings by applying a set of rule-based alterations to the user input; parsing a selected transformed text string from the set of transformed text strings to identify a set of tokens; identifying one or more prioritized tokens from the set of tokens, the one or more prioritized tokens associated with one or more prioritized categories; identifying one or more non-prioritized tokens from the set of tokens, the one or more non-prioritized tokens associated with one or more non-prioritized categories; sequentially executing a set of ordered binary classification tests for each of the one or more prioritized tokens until a true indication associated with a sequential binary classification test of the set of ordered binary classification tests is received; and sending, based on the true indication for the sequential binary classification test, a classification for the user input to a domain service associated with a content service of the web-based application.

Clause 2: The method of Clause 1, further comprising sending metadata to the domain service, wherein the metadata is associated with one or more of the classification for the user input, a binary classification test identifier, a language for the user input, and entity information corresponding to the user input.

Clause 3: The method of Clause 2, wherein generating the set of transformed text strings further comprises: generating a first transformed text string by removing punctuation in the text string; generating a second transformed text string by expanding acronyms and abbreviations in the first transformed text string; and generating third transformed text string by removing spaces between words in the second transformed text string.

Clause 4: The method of any one of Clauses 1-3, further comprising determining a language of the selected transformed text string; and parsing the selected transformed text string to categorize the set of tokens based on the determined language, wherein the set of ordered binary classification tests are ordered based on the determined language of the selected transformed text string.

Clause 5: The method of any one of Clauses 1-4, wherein sequentially executing the set of the ordered binary classification tests further comprises using a classification algorithm for leveraging one or more datasets of a custom taxonomy, the custom taxonomy based on domain data, linguistic data, classification outputs, and behaviors, and the classification algorithm and the one or more datasets each correspond to the determined language of the selected transformed text string.

Clause 6: The method of any one of Clauses 1-5, further comprising logging a dataset comprising data associated with one or more of, the user input, the selected transformed text string, the classification, and the metadata associated with the classification; categorizing the data of the dataset; and sending the logged and categorized data of the dataset to a storage component.

Clause 7: The method of any one of Clauses 1-6, wherein sequentially executing the set of the ordered binary classification tests further comprises using a classification algorithm for leveraging data of a taxonomy to receive the classification for the user input.

Clause 8: The method of any one of Clauses 1-7, further comprising updating the taxonomy by iteratively syncing, at predetermined intervals, the taxonomy with taxonomy data of an accessible binary large object storage, wherein the accessible binary large object storage is configured to sync with a graph database associated with a taxonomy management tool.

Clause 9: The method of any one of Clauses 1-8, wherein the set of ordered binary classification tests comprise tests for categorizing one or more of job titles, skills, and employers.

Clause 10: The method of any one of Clauses 1-9, wherein the entity information corresponding to the user input comprises remediating information for fixing an error associated with the user input.

Clause 11: A processing system, comprising: a memory comprising computer-executable instructions; and a processor configured to execute the computer-executable instructions and cause the processing system to perform a method in accordance with any one of Clauses 1-10.

Clause 12: A non-transitory computer-readable medium storing program code for causing a processing system to perform the steps of any one of Clauses 1-10.

Clause 13: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in FIGURES, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing entity recognition to classify user inputs for resolving user intent, the method comprising:

23 receiving user input comprising a text string, wherein the user input is associated with a web-based application;

generating a set of transformed text strings by applying a set of rule-based alterations to the user input;

parsing a selected transformed text string from the set of transformed text strings to identify a set of tokens;

identifying one or more prioritized tokens from the set of tokens, the one or more prioritized tokens associated with one or more prioritized categories;

identifying one or more non-prioritized tokens from the set of tokens, the one or more non-prioritized tokens associated with one or more non-prioritized categories;

sequentially executing a set of ordered binary classification tests for each of the one or more prioritized tokens until a true indication associated with a sequential binary classification test of the set of ordered binary classification tests is received, wherein sequentially executing t e set of ordered binary classification tests further comprises implementing a classification algorithm configured to leverage data of a taxonomy to determine a classification for the user input; and sending, based on the true indication for the sequential binary classification test, the classification for the user input to a domain service associated with a content service of the web-based application.

2. The method of claim 1, further comprising sending metadata to the domain service, wherein the metadata is associated with one or more of the classification for the user input, a binary classification test identifier, a language for the user input, and entity information corresponding to the user input.

3. The method of claim 2, wherein the entity information corresponding to the user input comprises remediating information for fixing an error associated with the user input.

4. The method of claim 1, wherein generating the set of transformed text strings further comprises:

generating a first transformed text string by removing punctuation in the text string;

generating a second transformed text string by expanding acronyms and abbreviations in the first transformed text string; and generating a third transformed text string by removing spaces between words in the second transformed text string.

5. The method of claim 1, further comprising:

determining a language of the selected transformed text string; and parsing the selected transformed text string to categorize the set of tokens based on the determined language, wherein the set of ordered binary classification tests are ordered based on the determined language of the selected transformed text string.

6. The method of claim 5, wherein:

sequentially executing the set of the ordered binary classification tests further comprises using the classification algorithm for leveraging one or more datasets of the taxonomy, the taxonomy based on domain data, linguistic data, classification outputs, and behaviors, and the classification algorithm and the one or more datasets each correspond to the determined language of the selected transformed text string.

7. The method of claim 1, further comprising:

logging a dataset comprising data associated with one or more of the user input, the selected transformed text string, the classification, and metadata associated with the classification;

24 categorizing the data of the dataset; and sending the logged and categorized data of the dataset to a storage component.

8. The method of claim 1, further comprising:

updating the taxonomy by iteratively syncing, at predetermined intervals, the taxonomy with taxonomy data of an accessible binary large object storage, wherein the accessible binary large object storage is configured to sync with a graph database associated with a taxonomy management tool.

9. The method of claim 1, wherein the set of ordered binary classification tests comprises tests for categorizing one or more of job titles, skills, and employers.

10. A processing system, comprising:

one or more memories comprising computer-executable instructions; and one or more processors configured to execute the computer-executable instructions causing the processing system to:

receive user input comprising a text string, wherein the user input is associated with a web-based application;

generate a set of transformed text strings by applying a set of rule-based alterations to the user input;

parse a selected transformed text string from the set of transformed text strings to identify a set of tokens;

identify one or more prioritized tokens from the set of tokens, the one or more prioritized tokens being associated with one or more prioritized categories;

identify one or more non-prioritized tokens from the set of tokens, the one or more non-prioritized tokens associated with one or more non-prioritized categories;

sequentially execute a set of ordered binary classification tests for each of the one or more prioritized tokens until a true indication associated with a sequential binary classification test of the set of ordered binary classification tests is received, wherein to sequentially execute the set of ordered binary classification tests the one or more processors are further configured to cause the processing system to implement a classification algorithm configured to leverage data of a taxonomy to determine a classification for the user input; and send, based on the true indication for the sequential binary classification test, the classification for the user input to a domain service associated with a content service of the web-based application.

11. The processing system of claim 10, wherein the one or more processors are further configured to cause the processing system to:

update the taxonomy by iteratively syncing, at predetermined intervals, the taxonomy with taxonomy data of an accessible binary large object storage, wherein the accessible binary large object storage is configured to sync with a graph database associated with a taxonomy management tool.

12. The processing system of claim 10, wherein the one or more processors are further configured to cause the processing system to send metadata to the domain service, wherein the metadata is associated with one or more of the classification for the user input, a binary classification test identifier, a language for the user input, and entity information corresponding to the user input.

13. The processing system of claim 12, wherein the entity information corresponding to the user input comprises remediating information for fixing an error associated with the user input.

14. The processing system of claim 10, wherein to generate the set of transformed text strings, the one or more processors are further configured to cause the processing system to:

generate a first transformed text string by removing punctuation in the text string;

generate a second transformed text string by expanding acronyms and abbreviations in the first transformed text string; and generate a third transformed text string by removing spaces between words in the second transformed text string.

15. The processing system of claim 10, wherein the one or more processors are further configured to cause the processing system to:

determine a language of the selected transformed text string; and parse the selected transformed text string to categorize the set of tokens based on the determined language, wherein the set of ordered binary classification tests are ordered based on the determined language of the selected transformed text string.

16. The processing system of claim 15, wherein:

to sequentially execute the set of the ordered binary classification tests, the one or more processors are further configured to use the classification algorithm for leveraging one or more datasets of the taxonomy, the taxonomy based on domain data, linguistic data, classification outputs, and behaviors, and the classification algorithm and the one or more datasets each correspond to the determined language of the selected transformed text string.

17. The processing system of claim 10, wherein the one or more processors are further configured to cause the processing system to:

log a dataset comprising data associated with one or more of the user input, the selected transformed text string, the classification, and metadata associated with the classification;

categorize the data of the dataset; and send the logged and categorized data of the dataset to a storage component.

18. The processing system of claim 10, wherein the set of ordered binary classification tests comprises tests for categorizing one or more of job titles, skills, and employers.

19. A method for performing entity recognition to classify user inputs for resolving user intent, the method comprising:

receiving user input comprising a text string wherein the user input is associated with a web-based application;

generating a set of transformed text strings by applying a set of rule-based alterations to the user input;

determining a language of a selected transformed text string from the set of transformed text strings;

parsing the selected transformed text string from the set of transformed text strings to identify and categorize a set of tokens based on the determined language;

identifying one or more prioritized tokens from the set of tokens, the one or more prioritized tokens associated with one or more prioritized categories;

identifying one or more non-prioritized tokens from the set of tokens, the one or more non-prioritized tokens associated with one or more non-prioritized categories;

sequentially executing a set of ordered binary classification tests for each of the one or more prioritized tokens until a true indication associated with a sequential binary classification test of the set of ordered binary classification tests is received, wherein the set of ordered binary classification tests are ordered based on the determined language of the selected transformed text string; and sending, based on the true indication for the sequential binary classification test, a classification for the user input to a domain service associated with a content service of the web-based application.

20. The method of claim 19, further comprising:

logging a dataset comprising data associated with one or more of the user input, the selected transformed text string, the classification, and metadata associated with the classification;

categorizing the data of the dataset; and sending the logged and categorized data of the dataset to a storage component.

\* \* \* \* \*